United States Patent
Swarup et al.

(12)

(10) Patent No.: US 6,270,905 B1
(45) Date of Patent: Aug. 7, 2001

(54) MULTI-COMPONENT COMPOSITE COATING COMPOSITION AND COATED SUBSTRATE

(75) Inventors: Shanti Swarup, Allison Park, PA (US); Walter Metzger, Denkendorf (DE); Giancarlo Cirani, Viarigi (IT); Debra L. Singer, Wexford, PA (US); Richard J. Sadvary, Pittsburgh, PA (US); Robyn E. McMillan, Allison Park, PA (US); James E. Reddy, Wexford, PA (US); Dieter Eiss, Leonberg (DE)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/329,408

(22) Filed: Jun. 10, 1999

Related U.S. Application Data

(63) Continuation-in-part of application No. 09/250,527, filed on Feb. 16, 1999.

(51) Int. Cl.⁷ .................................................. B32B 15/08
(52) U.S. Cl. ......................... 428/463; 428/461; 428/520; 428/522; 525/303
(58) Field of Search ........................ 525/301, 303, 525/296, 292, 279, 311, 332; 428/461, 463, 522, 520

(56) References Cited

U.S. PATENT DOCUMENTS

| | | |
|---|---|---|
| Re. 33,008 | 8/1989 | Ruffner et al. ............... 526/270 |
| 3,684,759 | 8/1972 | Reiff et al. .................. 260/29.6 NR |
| 4,070,323 | 1/1978 | Vanderhoff et al. .......... 260/29.6 NR |
| 4,147,679 | 4/1979 | Scriven et al. ................ 260/29.2 |
| 4,170,582 * | 10/1979 | Mori .............................. 524/531 |
| 4,271,051 | 6/1981 | Eschwey ........................ 260/22 M |
| 4,335,029 | 6/1982 | Dabi et al. ..................... 524/589 |
| 4,390,658 | 6/1983 | Graetz et al. .................. 524/512 |
| 4,403,003 | 9/1983 | Backhouse ..................... 427/407.1 |
| 4,451,596 | 5/1984 | Wilk et al. .................... 523/501 |
| 4,453,261 | 6/1984 | Waite et al. ................... 524/458 |
| 4,616,074 | 10/1986 | Ruffner ......................... 526/318 |
| 4,618,448 | 10/1986 | Cha et al. ..................... 252/180 |
| 4,719,132 | 1/1988 | Porter, Jr. ..................... 427/409 |
| 4,791,168 | 12/1988 | Salatin et al. ................. 524/601 |
| 4,849,480 | 7/1989 | Antonelli et al. ............. 525/303 |
| 4,851,460 | 7/1989 | Stranghöner et al. ......... 523/407 |
| 4,891,111 | 1/1990 | McCollum et al. ........... 204/181.7 |
| 4,933,056 | 6/1990 | Corrigan et al. .............. 204/181.7 |
| 5,015,688 | 5/1991 | Bederke et al. ............... 524/600 |
| 5,026,818 | 6/1991 | Heinz et al. ................... 528/313 |
| 5,071,904 | 12/1991 | Martin et al. ................. 524/458 |
| 5,084,541 | 1/1992 | Jacobs, III et al. ........... 528/45 |
| 5,098,947 | 3/1992 | Metzger et al. ............... 524/507 |
| 5,136,004 | 8/1992 | Bederke et al. ............... 526/273 |
| 5,155,163 | 10/1992 | Abeywardena et al. ...... 524/591 |
| 5,264,482 | 11/1993 | Taylor et al. ................. 524/548 |
| 5,306,774 | 4/1994 | Landry et al. ................ 525/221 |

(List continued on next page.)

FOREIGN PATENT DOCUMENTS

| | | |
|---|---|---|
| 2627320 | 12/1977 | (DE) . |
| 013478 | 12/1978 | (EP) . |
| 0069839 | 1/1983 | (EP) . |
| 0038127 | 10/1984 | (EP) . |
| 0210747 | 2/1987 | (EP) . |
| 0238166 B1 | 9/1991 | (EP) . |
| 0567214 A1 | 10/1993 | (EP) . |
| 0567214 B1 | 10/1993 | (EP) . |
| 0238166 B2 | 9/1994 | (EP) . |
| 0794212 | 9/1997 | (EP) . |
| 2539138 | 1/1983 | (FR) . |
| 2060657 | 10/1979 | (GB) . |
| 2064561 | 12/1979 | (GB) . |
| 2064562 | 12/1979 | (GB) . |
| 1579672 | 11/1980 | (GB) . |
| 2127835 | 10/1982 | (GB) . |
| 2120261 | 5/1983 | (GB) . |
| 2141127 | 12/1984 | (GB) . |
| 53005228 | 1/1978 | (JP) . |
| 55090563 | 7/1980 | (JP) . |
| 56020007 | 2/1981 | (JP) . |
| 56122843 | 9/1981 | (JP) . |
| 82061294 | 12/1982 | (JP) . |
| 60123564 | 12/1983 | (JP) . |
| 60202158 | 10/1985 | (JP) . |
| 61145254 | 7/1986 | (JP) . |
| 06239957 | 8/1994 | (JP) . |
| 10292084 | 11/1998 | (JP) . |
| 2000-44635 | 2/2000 | (JP) . |
| WO 94/05733 | 3/1994 | (WO) . |
| WO 95/07951 | 3/1995 | (WO) . |
| WO 95/27013 | 10/1995 | (WO) . |
| WO 97/30097 | 8/1997 | (WO) . |

OTHER PUBLICATIONS

"Non aqueous resin dispersion . . . "; *Derwent Documentation Abstracts Journal.* ; No. 03, 1999, XP002141159. (No month).

English Abstract for EP 69839 Jan. 1983.

English Abstract for DE 2627320 Dec. 1997.

(List continued on next page.)

*Primary Examiner*—Blaine Copenheaver
*Assistant Examiner*—Christopher Paulraj
(74) *Attorney, Agent, or Firm*—Deborah M. Altman; Jacques B. Miles

(57) ABSTRACT

A coated substrate is provided which includes an outer coating formed from a film-forming composition which includes a crosslinkable, non-gelled acrylic polymer and a crosslinking material capable of reacting with the acrylic polymer to form a crosslinked outer coating. The acrylic polymer is the reaction product of a polyoxyalkylene acrylate monomer comprising a terminal alkoxy group containing about 1 to about 6 carbon atoms and a copolymerizable ethylenically unsaturated monomer different from the polyoxyalkylene acrylate monomer. A multi-component composite coating composition is also provided.

34 Claims, No Drawings

U.S. PATENT DOCUMENTS

| | | | |
|---|---|---|---|
| 5,342,882 | 8/1994 | Göbel et al. | 524/832 |
| 5,349,036 | 9/1994 | Simpson et al. | 526/320 |
| 5,354,807 | 10/1994 | Dochniak | 524/591 |
| 5,356,973 | 10/1994 | Taljan et al. | 524/314 |
| 5,368,944 | 11/1994 | Hartung et al. | 428/423.1 |
| 5,395,659 | 3/1995 | Gräf et al. | 427/407.1 |
| 5,401,790 | 3/1995 | Poole et al. | 524/199 |
| 5,412,023 | 5/1995 | Hille et al. | 524/539 |
| 5,459,197 | 10/1995 | Schwindt et al. | 524/591 |
| 5,460,892 | 10/1995 | Bederke et al. | 428/482 |
| 5,468,802 | 11/1995 | Wilt et al. | 524/539 |
| 5,554,686 | 9/1996 | Frisch, Jr. et al. | 524/588 |
| 5,589,534 | 12/1996 | Metzger et al. | 524/548 |
| 5,614,584 | 3/1997 | Schwan et al. | 524/591 |
| 5,635,559 | 6/1997 | Brock et al. | 524/839 |
| 5,646,214 | 7/1997 | Mayo | 525/10 |
| 5,648,410 | 7/1997 | Hille et al. | 523/501 |
| 5,684,072 | 11/1997 | Rardon et al. | 524/199 |
| 5,698,330 | 12/1997 | Bederke et al. | 428/423.1 |
| 5,703,155 | 12/1997 | Swarup et al. | 524/558 |
| 5,741,552 | 4/1998 | Takayama et al. | 427/407.1 |
| 5,759,694 | 6/1998 | Mayo et al. | 428/423.1 |
| 5,760,107 | 6/1998 | Valko et al. | 523/404 |
| 5,814,410 | 9/1998 | Singer et al. | 428/423.1 |
| 5,925,698 | 7/1999 | Steckel | 524/322 |
| 5,965,670 | 10/1999 | Mauer et al. | 525/398 |
| 6,048,953 * | 4/2000 | Kawashima et al. | 526/318.4 |

OTHER PUBLICATIONS

Kirk–Othmer, Encyclopedia of Chemical Technology, (1963) vol. 1 at pp. 203–205, 259–297, 305–307 (No month).

J. Nelson et al., "Castor–Based Derivatives: Synthesis of Some Acrylate Esters", J. Am. Oil Chem Society 43(9) 1966 pp. 542–545 (No month).

H. Xiao et al., "Preparation and Kinetic Characterization of Copolymers of Acrylamide and Poly (ethylene glycol) (meth)acrylate Macromonomers", 37 *Polymer* 7, pp. 1201–1209 (1996). (No month).

Textbook of Polymer Chemistry, pp 79–81 (1957). (No month).

* cited by examiner

MULTI-COMPONENT COMPOSITE COATING COMPOSITION AND COATED SUBSTRATE

CROSS-REFERENCE TO RELATED APPLICATION

This patent application is a continuation-in-part of U.S. patent application Ser. No. 09/250,527 entitled "Multi-Component Composite Coating Composition and Coated Substrate", filed Feb. 16, 1999 pending.

FIELD OF THE INVENTION

The present invention relates to outer coatings for substrates and, more particularly to monocoats or multi-component composite coating compositions which provide good smoothness and appearance in automotive coating applications.

BACKGROUND OF THE INVENTION

Over the past decade, there has been a concerted effort to reduce atmospheric pollution caused by volatile solvents that are emitted during the painting process. However, it is often difficult to achieve high quality, smooth coating finishes, such as are required in the automotive industry, without using organic solvents which contribute greatly to flow and leveling of a coating.

One of the major goals of the coatings industry is to minimize the use of organic solvents by formulating waterborne coating compositions which provide a smooth, high gloss appearance, as well as good physical properties including resistance to acid rain. Unfortunately, many waterborne coating compositions do not provide acceptable appearance. If sufficient water is not removed during drying of the basecoat, the topcoat can crack, bubble or "pop" during drying of the topcoat as water vapor from the basecoat attempts to pass through the topcoat. Another challenge to formulators of waterborne coatings is to provide good acid resistance, particularly battery acid resistance, while maintaining acceptable physical properties.

Therefore, it would be desirable to provide a waterborne coating composition which is useful as an original finish for automobiles and which can be applied as a smooth, acid resistant film under a variety of conditions with minimal popping.

SUMMARY OF THE INVENTION

The present invention provides a coated substrate having on at least a portion of a surface thereof an outer coating deposited from a film-forming composition, the film-forming composition comprising: (a) a crosslinkable, non-gelled acrylic polymer which is the reaction product of the following monomers: (i) a polyoxyalkylene acrylate monomer comprising a terminal alkoxy group containing about 1 to about 6 carbon atoms; and (ii) a copolymerizable ethylenically unsaturated monomer different from the polyoxyalkylene acrylate monomer (i); and (b) a crosslinking material capable of reacting with the acrylic polymer to form a crosslinked outer coating.

Another aspect of the present invention is a multi-component composite coating composition comprising a basecoat deposited from a pigmented basecoat film-forming composition and an outer coating applied over the basecoat in which the outer coating is deposited from the above film-forming composition. A substrate coated with the multi-component composite coating composition also is provided.

DETAILED DESCRIPTION OF THE PREFERRED EMBODIMENTS

The coated substrates and multi-component composite coating composition of the present invention are useful in a variety of coating applications, and are particularly useful in automotive coating applications. In one embodiment, the transparent or opaque, clear or colored outer coating is present as a monocoat. In an alternative preferred embodiment, the outer coating is applied over a pigmented or colored basecoat layer to form a multi-component composite coating composition.

The waterborne, solventborne or powder film-forming composition used to form the outer coating comprises one or more crosslinkable, non-gelled acrylic polymers and one or more crosslinking materials capable of reacting with the acrylic polymer(s) to form a crosslinked outer coating. The film-forming composition forms a self-supporting continuous film on at least a horizontal surface of the substrate upon removal of any solvents or carriers present in the aqueous coating composition or curing at ambient or elevated temperature.

As used herein, "ungelled" or "non-gelled" means that the acrylic polymer is substantially free of crosslinking (before mixing and reaction with the crosslinking materials of the aqueous coating composition) and has an intrinsic viscosity of less than about 4.0 deciliters per gram, preferably less than about 2.0 deciliters per gram, and more preferably between ranging from about 0.1 to about 1.5 deciliters per gram when dissolved in a suitable solvent without depolymerization. The intrinsic viscosity of the acrylic polymer can be determined by art-recognized methods such as are described in *Textbook of Polymer Science,* Billmeyer, Interscience Publishers, New York (1957) at pages 79–81.

The crosslinkable, non-gelled acrylic polymer is the polymerization reaction product of one or more polyoxyalkylene acrylate monomers and one or more copolymerizable ethylenically unsaturated monomers which are chemically different from the polyoxyalkylene acrylic monomers, i.e., have at least one element or amount of an element which is different from the polyoxyalkylene acrylic monomer. The acrylic polymer can be self-crosslinking, for example by forming the acrylic polymer from acrylic monomers capable of internally crosslinking such as n-butoxymethacrylamide, or crosslinked by reaction with suitable crosslinking materials included in the film-forming composition. The acrylic polymer can be cationic, anionic or nonionic, but is preferably anionic.

Generally, the polyoxyalkylene acrylate monomer comprises a backbone of repeating alkylene glycol units. The monomer is terminated at one end with an acrylate group and at the other end with an alkoxy group containing about 1 to about 6 carbon atoms. The polyoxyalkylene acrylic monomer can further comprise one or more pendant functional groups such as hydroxy, amido, carboxy, carbamate, urea, mercapto or urethane.

Preferably, the polyoxyalkylene acrylate monomer has a structure (including isomers thereof as shown in Formula (I) below:

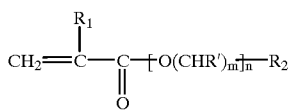

(I)

wherein $R_1$ is H or $CH_3$; $R_2$ is a terminal alkoxy group containing about 1 to about 6 carbon atoms, such as methoxy (preferred), ethoxy, butoxy, pentoxy and hexoxy; R' is independently selected from H or $CH_3$; m is an integer which can range from about 2 to about 4; and n is an integer which can range from about 2 to about 200, preferably ranges from about 3 to about 40 and more preferably ranges from about 4 to about 20.

Non-limiting examples of suitable polyoxyalkylene acrylate monomers include alkoxy polyoxyethylene acrylates, alkoxy polyoxyethylene methacrylates, alkoxy polyoxypropylene acrylates, alkoxy polyoxypropylene methacrylates, alkoxy polyoxyethyleneyoxypropylene acrylates, alkoxy polyoxyethyleneoxypropylene methacrylates and mixtures thereof. Preferably, the polyoxyalkylene acrylate monomer is methoxy polyoxyethylene methacrylate (also known as methoxy polyethylene glycol methacrylate).

The polyoxyalkylene acrylic monomer can comprise about 0.5 to about 80 weight percent of the monomers used to produce the acrylic polymer, preferably about 0.7 to about 20 weight percent, and more preferably about 1 to about 10 weight percent.

Suitable ethylenically unsaturated monomers which can be reacted with the polyoxyalkylene acrylic monomer include ethylenically unsaturated carboxylic acid monomers, alkyl esters of ethylenically unsaturated carboxylic acid monomers, hydroxyalkyl esters of ethylenically unsaturated carboxylic acid monomers, ethylenically unsaturated carbamates, ethylenically unsaturated ureas, ethylenically unsaturated urethanes, ethylenically unsaturated mercaptans, ethylenically unsaturated silanes, vinyl aromatics such as styrene and vinyl toluene, acrylamides, acrylonitriles such as acrylonitrile and methacrylonitrile, vinyl halides and vinylidene halides such as vinyl chloride and vinylidene fluoride, vinyl acetates, vinyl ethers, allyl ethers, allyl alcohols, vinyl esters such as vinyl acetate, vinyl sulfonic acid, vinyl phosphonic acid, derivatives thereof and mixtures thereof.

Useful ethylenically unsaturated carboxylic acid monomers include acrylic acid, methacrylic acid, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof.

Suitable alkyl esters of ethylenically unsaturated carboxylic acid monomers include aliphatic alkyl esters containing from 1 to 30, and preferably 4 to 18 carbon atoms in the alkyl group such as methyl acrylate, ethyl acrylate, butyl acrylate, methyl methacrylate, ethyl methacrylate, butyl methacrylate, isobutyl methacrylate, 2-ethylhexyl acrylate, 2-ethylhexyl methacrylate, ethylene glycol dimethacrylate, isobornyl methacrylate, lauryl methacrylate and mixtures thereof.

Useful hydroxyalkyl esters of ethylenically unsaturated carboxylic acid monomers include 2-hydroxyethyl acrylate, 2-hydroxyethyl methacrylate, hydroxybutyl acrylate, hydroxypropyl methacrylate, a reaction product of hydroxyethyl methacrylate and a lactone, and monomers formed from:

(a) an ethylenically unsaturated, epoxy functional monomer and a carboxylic acid containing about 13 to about 20 carbon atoms; or (b) an ethylenically unsaturated acid functional monomer and an epoxy compound containing at least 5 carbon atoms which is not polymerizable with the ethylenically unsaturated acid functional monomer.

Non-limiting examples of suitable ethylenically unsaturated, epoxy functional monomers include glycidyl acrylate; glycidyl methacrylate; allyl glycidyl ether; methallyl glycidyl ether; 1:1 (molar) adducts of ethylenically unsaturated monoisocyanates with hydroxy functional monoepoxides; glycidyl esters of polymerizable polycarboxylic acids such as maleic acid, fumaric acid and crotonic acid; and mixtures thereof. Useful carboxylic acids include saturated monocarboxylic acids such as those which are noncrystalline at room temperature and which are preferably branched. A preferred monocarboxylic acid is isostearic acid. As used herein, "saturated monocarboxylic acid" means that the monocarboxylic acid is preferably free of ethylenic unsaturation but can contain aromatic unsaturation such as a benzene ring.

Examples of ethylenically unsaturated acid functional monomers useful for forming hydroxyalkyl esters of ethylenically unsaturated carboxylic acid monomers include monocarboxylic acids such as acrylic acid, methacrylic acid and crotonic acid; dicarboxylic acids such as itaconic acid, maleic acid and fumaric acid; monoesters of dicarboxylic acids such as monobutyl maleate and monobutyl itaconate; and mixtures thereof. Acrylic acid and methacrylic acid are preferred.

The epoxy compound does not contain ethylenic unsaturation that would participate in free radical-initiated polymerization with the ethylenically unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether and para-(tertiary butyl) phenyl glycidyl ether. Preferred glycidyl esters include those of the structure (II):

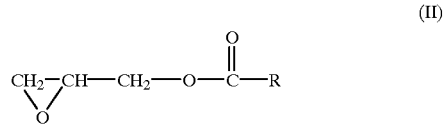

(II)

wherein R is a hydrocarbon radical containing from about 4 to about 26 carbon atoms. Preferably, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

Preferably, the hydroxyalkyl ester of an ethylenically unsaturated carboxylic acid monomer is the reaction product of an ethylenically unsaturated acid functional monomer such as (meth)acrylic acid and an epoxy compound which is a glycidyl ester of neodecanoic acid.

Generally, the ethylenically unsaturated monomer(s) comprise about 10 to about 99.5 percent by weight of the monomers used to produce the acrylic polymer, preferably about 80 to about 99.5 weight percent and more preferably about 90 to about 99 weight percent.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. Other useful carbamate functional monomers are disclosed in U.S. Pat. No. 5,098,947, which is incorporated herein by reference.

Hydroxy functional groups can be included in the acrylic polymer by copolymerizing the acrylic monomers with a hydroxy functional vinyl monomer, such as 4-hydroxybutyl acrylate, hydroxyethyl methacrylate or hydroxypropyl acrylate.

Amide functional groups can be included in the acrylic polymer by copolymerizing the acrylic monomers with an amide functional monomer, such as acrylamide, methacrylamide or n-butoxy methacrylamide.

Carboxy functional groups can be included in the acrylic polymer by copolymerizing the acrylic monomers with an ethylenically unsaturated acid functional monomer such as are described above.

Urethane functional groups can be included in the acrylic polymer by copolymerizing the acrylic monomers with a urethane functional monomer such as the reaction product of an ethylenically unsaturated isocyanate with an alkanol.

Urea functional groups can be included in the acrylic polymer by copolymerizing the acrylic monomers with a urea functional monomer such as hydroxyethyl ethylene urea (meth)acrylate.

Other components which are useful in forming the acrylic polymer include polyesters, surfactants, initiators, chain transfer agents and solvents. Suitable polyesters include hydroxy functional ethylenically unsaturated polyesters. Useful surfactants include sodium lauryl sulfate. Examples of useful chain transfer agents include mercaptol, ethanol and isopropanol. Suitable solvents include butyl ether of dipropylene glycol, methyl ether of propylene glycol and xylene.

Preferably, the acrylic polymer is the reaction product of an alkoxy polyoxyethylene methacrylate, acrylic acid, glycidyl ester of neodecanoic acid, hydroxy butyl acrylate, styrene, butyl acrylate and isobutyl methacrylate.

Methods for polymerizing acrylic monomers with themselves and/or other addition polymerizable monomers and preformed polymers are well known to those skilled in the art of polymers and further discussion thereof is not believed to be necessary in view of the present disclosure. For example, polymerization of the acrylic monomer can be carried out in aqueous or organic solvent solution such as xylene, in emulsion, or in aqueous dispersion. See Kirk-Othmer, *Encyclopedia of Chemical Technology*, (1963) Vol. 1 at page 305.

Preferably, the acrylic polymer is prepared by solution polymerization. The polymerization can be effected by means of a suitable initiator system, including free radical initiators such as t-amyl peracetate or di-t-amyl peroxide, anionic initiation or organometallic initiation. Molecular weight can be controlled by choice of solvent or polymerization medium, concentration of initiator or monomer, temperature, and the use of chain transfer agents. Typically, the solvent is charged to a reaction vessel and heated to reflux, optionally under an inert atmosphere. The monomers and free radical initiator are added slowly to the refluxing reaction mixture. After the addition is complete, additional initiator may be added and the reaction mixture held at an elevated temperature to complete the reaction. If additional information is needed, such polymerization methods are disclosed in *Kirk-Othmer*, Vol. 1 at pages 203–205, 259–297 and 305–307, which are incorporated by reference herein.

The number average molecular weight ($M_n$) of the acrylic polymer can range from about 500 to about 20,000 grams per mole and is preferably about 2,000 to about 10,000, as determined by gel permeation chromatography using a polystyrene standard. The glass transition temperature of the acrylic polymer can range from about −20° C. to about 100° C., preferably about −10° C. to about 80° C., and more preferably about 0° C. to about 30° C. as measured using a Differential Scanning Calorimeter (DSC), for example a Perkin Elmer Series 7 Differential Scanning Calorimeter, a temperature range of about −55° C. to about 150° C. and a scanning rate of about 20° C. per minute.

The acrylic polymer can have an acid value ranging from about 2 to about 70 mg KOH/g resin, preferably about 5 to about 50 mg KOH/g resin, and more preferably about 10 to about 20 mg KOH/g resin. The acid value (number of milligrams of KOH per gram of solid required to neutralize the acid functionality in the acrylic polymer) is a measure of the amount of acid functionality in the acrylic polymer. The acrylic polymer can have a hydroxyl value or number ranging from about 50 to about 150 mg KOH per gram of acrylic polymer.

To disperse the acrylic polymer, the carboxylic acid functional groups can be neutralized using amines such as dimethylethanolamine, ammonia, triethanolamine, dimethylethyl ethanolamine or N',N'-dimethyl aminopropylamine. The neutralized acrylic polymer can be dispersed directly into the film-forming composition with or without use of external surfactants, as desired. Generally, the acrylic polymer is present in an amount ranging from about 10 to about 90 weight percent on a basis of total resin solids of the film-forming composition, preferably about 20 to about 80 weight percent, and more preferably about 50 to about 75 weight percent.

The film-forming composition can further comprise one or more crosslinking materials capable of reacting with the crosslinkable acrylic polymer to form a crosslinked film. The crosslinking material can be present as a mixture with the other components of the coating composition (conventionally referred to as a one-pack system), or in a separate composition which is mixed with the crosslinkable acrylic polymer within a few hours prior to application of the coating composition to the substrate (conventionally referred to as a two-pack system).

Suitable crosslinking materials include aminoplasts, triazines, polyisocyanates and mixtures thereof. Useful aminoplast resins are based on the addition products of formaldehyde with an amino- or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula $C_3N_3(NHCOXR)_3$ where X is nitrogen, oxygen or carbon and R is a lower alkyl group having from one to twelve carbon atoms or mixtures of lower alkyl groups, such as methyl, ethyl, propyl, butyl, n-octyl and 2-ethylhexyl. Such compounds and their preparation are described in detail in U.S. Pat. No. 5,084,541, which is hereby incorporated by reference.

The aminoplast resins preferably contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. The preferred aminoplast resins are partially alkylated with methanol or butanol or mixtures thereof.

The polyisocyanate which is utilized as a crosslinking agent can be prepared from a variety of isocyanate-containing materials. Preferably, the polyisocyanate is a blocked polyisocyanate. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used. Examples of suitable blocking agents include those materials which would unblock at elevated temperatures such as lower aliphatic alcohols including methanol, oximes such as methyl ethyl ketoxime, lactams such as caprolactam and pyrazoles such as dimethyl pyrazole.

Preferably, the crosslinking material is a mixture of partially alkylated melamine formaldehyde condensates and a carbamoyl triazine.

Generally, the crosslinking material is present in an amount ranging from about 10 to about 90 weight percent on a basis of total resin solids of the film-forming composition, preferably about 15 to about 65 weight percent and, more preferably, about 20 to about 40 weight percent.

The film-forming composition can further comprise one or more other crosslinkable film-forming resins selected from the group consisting of polyesters, polyurethanes, acrylic polymers, polyamides, polyethers and copolymers and mixtures thereof, the crosslinkable film-forming resin being chemically different from the acrylic polymer discussed above, i.e., including at least one different component or percentage of component. These resins can be self-crosslinking or crosslinked by reaction with suitable crosslinking materials included in the aqueous film-forming composition. Suitable crosslinkable film-forming resins include acrylic polymers such as copolymers of one or more alkyl esters of acrylic acid or methacrylic acid, optionally together with one or more other polymerizable ethylenically unsaturated monomers such as are discussed in detail above.

Suitable alkyd resins or polyesters can be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylol propane and pentaerythritol. Suitable polycarboxylic acids include succinic acid, adipic acid, azelaic acid, sebacic acid, maleic acid, fumaric acid, phthalic acid, tetrahydrophthalic acid, hexahydrophthalic acid and trimellitic acid. Besides the polycarboxylic acids mentioned above, functional equivalents of the acids such as anhydrides where they exist or lower alkyl esters of the acids such as methyl esters can be used. Where it is desired to produce air-drying alkyd resins, suitable drying oil fatty acids can be used and include those derived from linseed oil, soya bean oil, tall oil, dehydrated castor oil, or tung oil. The polyesters and alkyd resins can contain a portion of free hydroxyl and/or carboxyl groups which are available for further crosslinking reactions.

Polyurethanes can also be used as a crosslinkable film-forming resin of the coating composition. Useful polyurethanes include polymeric polyols which are prepared by reacting polyester polyols or acrylic polyols, such as those mentioned above, with a polyisocyanate such that the OH/NCO equivalent ratio is greater than 1:1 so that free hydroxyl groups are present in the product.

The organic polyisocyanate which is used to prepare the polyurethane polyol can be an aliphatic or aromatic polyisocyanate or mixtures thereof. Diisocyanates are preferred, although higher polyisocyanates can be used in place of or in combination with diisocyanates. Examples of suitable aromatic diisocyanates include 4,4'-diphenylmethane diisocyanate and toluene diisocyanate. Examples of suitable aliphatic diisocyanates include straight chain aliphatic diisocyanates such as 1,6-hexamethylene diisocyanate. Also, cycloaliphatic diisocyanates such as isophorone diisocyanate and 4,4'-methylene-bis-(cyclohexyl isocyanate) can be used. Examples of suitable higher polyisocyanates include 1,2,4-benzene triisocyanate and polymethylene polyphenyl isocyanate.

Usually the polyester and polyurethane are prepared with unreacted carboxylic acid groups, which upon neutralization with bases such as amines allows for dispersion into aqueous medium.

Other useful crosslinkable film-forming resins include polyamides, such as acrylamide, methacrylamide, N-alkylacrylamides and N-alkylmethacrylamides, and polyethers such as polyethylene glycol or polypropylene glycol.

Generally, such crosslinkable film-forming resins can have a weight average molecular weight greater than about 2000 grams per mole, preferably ranging from about 2000 to about 100,000 grams per mole (as determined by gel permeation chromatography using a polystyrene standard) and a hydroxyl equivalent weight ranging from about 400 to about 4000 grams per equivalent. The term "equivalent weight" is a calculated value based on the relative amounts of the various ingredients used in making the specified material and is based on the solids of the specified material. The relative amounts are those that result in the theoretical weight in grams of the material, such as a polymer produced from the ingredients, and give a theoretical number of the particular functional group that is present in the resulting polymer. The theoretical polymer weight is divided by the theoretical number to give the equivalent weight. For example, hydroxyl equivalent weight is based on the equivalents of reactive pendant and/or terminal hydroxyl groups in the hydroxyl-containing polymer.

The crosslinkable film-forming resin can have an acid value ranging from about 5 to about 100 mg KOH/g resin, and preferably about 5 to about 50 mg KOH/g resin. Generally, the crosslinkable film-forming resin is present in an amount ranging from about 1 to about 80 weight percent on a basis of total resin solids of the film-forming composition, and preferably about 2 to about 30 weight percent.

The film-forming composition can further comprise one or more amphiphilic adjuvants. The amphiphilic adjuvant has a water-soluble, generally hydrophilic polar end and a water-insoluble, generally hydrophobic hydrocarbon end. The adjuvant can be present as a compound consisting of a single molecular species, oligomer or polymer, but preferably is an oligomer having a number average molecular weight ranging from about 200 to about 3000 grams per mole, and more preferably about 300 to about 800 grams per mole, as determined by gel permeation chromatography using polystyrene as a standard.

The adjuvant is preferably essentially free of acid functionality, i.e., it has an acid value of less than 30 mg KOH/g adjuvant, preferably less than about 20 mg KOH/g adjuvant, more preferably less than about 10 mg KOH/g adjuvant, and most preferably less than about 5 mg KOH/g adjuvant.

The adjuvant has one or more terminal hydrophilic groups positioned at its water-soluble polar end. Suitable hydrophilic groups include hydroxyl groups (preferred), carbamate groups, amide groups, urea groups and mercaptan groups. One or more or combinations of these groups can be present as pendant functional groups along the backbone of the adjuvant. Preferably, the hydrophilic polar end of the adjuvant has one or more, and preferably an average of one to about three, terminal hydroxyl groups.

The hydrocarbon end of the adjuvant can be a pendant or terminal end group, but preferably is a terminal end group positioned generally opposite to the water-soluble polar end of the adjuvant. The hydrocarbon end of the adjuvant comprises at least six contiguous carbon atoms, preferably in a linear hydrocarbon chain. In a preferred embodiment, the hydrocarbon end includes at least 7 contiguous carbon atoms, preferably 7 to about 24, and more preferably 7 to about 18 contiguous carbon atoms. Preferably, the hydrocarbon end of the adjuvant is free of hydrophilic functional groups.

The adjuvant can be saturated or unsaturated, but preferably it is at least substantially saturated along the hydrocarbon chain. The adjuvant can be branched or unbranched, and can include functional groups such ester groups and/or ether groups and/or other functional groups containing nitrogen, oxygen, or sulfur. Preferably such functional groups are not positioned near the hydrophobic end.

Generally, the adjuvant has a hydroxyl number which is greater than about 100 mg KOH/g of adjuvant, preferably ranges from about 100 to about 300 mg KOH/g, and more preferably about 150 to about 250 mg KOH/g.

In a preferred embodiment, the adjuvant is prepared by esterification of reactants comprising one or more monocarboxylic acids and one or more polyols, preferably in a 1:1 molar ratio. Suitable monocarboxylic acids include heptanoic acid, caprylic acid, pelargonic acid, capric acid, n-undecylic acid, lauric acid, myristic acid, palmitic acid, margaric acid, stearic acid, isostearic acid, arachidic acid, behenic acid, lignoceric acid, cerotic acid, oleic acid, elaidic acid, linoleic acid, linolenic acid, dihydroxystearic acid, ricinoleic acid and isomers and mixtures thereof. Useful polyols include 1,4-butanediol, 1,6-hexanediol, neopentyl glycol, ethylene glycol, diethylene glycol, 2,3-butylene glycol, glycerol, trimethylolpropane, ditrimethylolpropane, pentaerythritol, sorbitol, mannitol and mixtures thereof. The polyol can include terminal groups such as short chain alkyl groups having 1 to 4 carbon atoms or amido groups.

Non-limiting examples of adjuvants prepared by the above esterification reaction include trimethylolpropane monoisostearate, ditrimethylolpropane isostearate, pentaerythritol isostearate and pentaerythritol diisostearate.

Additional reactants can be included in the reaction, such as one or more polycarboxylic acids, polyfunctional amines, polyfunctional isocyanates and mixtures thereof. Useful polycarboxylic acids include 1,4-cyclohexane dicarboxylic acid, dimer fatty acids, and other carboxylic acids such as are disclosed in U.S. Pat. No. 5,468,802 at column 2, lines 49–65 which are incorporated by reference herein. A useful mixture of isomers of 1,4-cyclohexane dicarboxylic acid is commercially available as EASTMAN® 1,4-CHDA from Eastman Kodak. For preparing a reaction product of isostearic acid, trimethylolpropane and 1,4-cyclohexane dicarboxylic acid, a high purity grade of EASTMAN® 1,4-CHDA having approximately 80:20 cis:trans isomers is preferred, although the "R" grade having 60:40 cis:trans also can be used. An example of a suitable adjuvant prepared by the above reaction using a polyfunctional amine instead of a polycarboxylic acid is stearyl diethanolamide.

Generally, if present, the polycarboxylic acid is present as an additional reactant in an amount of less than about 50 weight percent on a basis of total weight of the reactants from which the adjuvant reaction product is prepared, preferably less than about 30 weight percent and, more preferably, less than about 20 weight percent.

The esterification reaction is carried out in accordance with techniques which are well known to those skilled in the art of polymer chemistry and a detailed discussion is not believed to be necessary. Generally, the reaction can be conducted by combining the ingredients and heating to a temperature of about 160° C. to about 230° C. Further details of the esterification process are disclosed in U.S. Pat. No. 5,468,802 at column 3, lines 4–20 and 39–45, which are incorporated by reference herein.

Alternatively, the adjuvant can be prepared from the reaction of one or more polycarboxylic acids, one or more polyols and one or more hydrocarbon alcohols comprising at least six contiguous carbon atoms in a manner well known to one skilled in the art. An example of this reaction is the formation of an oligomeric ester from phthalic anhydride, pentaerythritol and stearyl alcohol. Suitable polycarboxylic acids and polyols are discussed above. Useful hydrocarbon alcohols include heptyl alcohol, octyl alcohol, pelargonic alcohol, n-decyl alcohol, n-undecyl alcohol, lauryl alcohol, myristyl alcohol, cetyl alcohol, margaryl alcohol, stearyl alcohol, isostearyl alcohol, n-nonadecyl alcohol, arachidyl alcohol, ceryl alcohol, palmitoleyl alcohol, oleyl alcohol, linoleyl alcohol, linolenyl alcohol, ricinoleyl alcohol and mixtures thereof.

In another alternative embodiment, the adjuvant can be prepared by reacting one or more amines comprising at least six contiguous carbon atoms and one or more reactants selected from carbonates or polycarboxylic acids and polyols in a manner well known to the skilled artisan. A non-limiting example is the reaction product of stearyl amine with glycerin carbonate to form N-stearyl dihydroxypropyl carbamate. Another example is the oligoamide-ester reaction product of stearyl amine with isophthalic acid and pentaerythritol. Useful amines include heptyl amine, octyl amine, pelargonyl amine, n-decyl amine, n-undecyl amine, lauryl amine, myristyl amine, cetyl amine, margyryl amine, stearyl amine, n-nonadecyl amine, arachidyl amine, and isomers and mixtures thereof. Suitable polycarboxylic acids and polyols are discussed above.

In yet another alternative embodiment, the adjuvant can be prepared by reacting one or more monocarboxylic acids with one or more epoxides, such as the glycidyl ether of versatic acid or glycidol, in a manner well known to one skilled in the art. A non-limiting example of an adjuvant prepared according to this reaction is the reaction product of isostearic acid and glycidol. Useful monocarboxylic acids are discussed above.

The adjuvant of the present invention can be added to the aqueous topcoat film-forming composition neat; that is, it is added by itself or in other resinous ingredients, or with solvents or other diluents.

Generally, the adjuvant is present in an amount ranging from about 0.01 to about 25 weight percent on a basis of total resin solids of the film-forming composition, preferably about 0.1 to about 20 weight percent and, more preferably, about 0.1 to about 15 weight percent.

If desired, the film-forming composition can comprise other optional materials well known in the art of formulated surface coatings, such as pigments or dyes, surfactants, flow control agents, thixotropic agents such as bentonite clay, fillers, water, organic solvents, catalysts, including phosphonic acids and other customary auxiliaries. Preferably the film-forming composition is waterborne, although it can be solventborne or powder, if desired.

Useful metallic pigments include aluminum flakes, bronze flakes, coated mica, nickel flakes, tin flakes, silver flakes, copper flakes and combinations thereof. Other suitable pigments include mica, iron oxides, lead oxides, carbon black, titanium dioxide and transparent or opaque colored organic pigments such as phthalocyanines.

Suitable organic solvents include alcohols having up to about 8 carbon atoms, such as ethanol, isopropanol, n-butanol; and alkyl ethers of glycols, such as 1-methoxy-2-propanol, dimethylformamide, xylene, and monoalkyl ethers of ethylene glycol, diethylene glycol and propylene glycol. Preferably, the cosolvent includes a propylene glycol monomethyl ether such as DOWANOL PM or dipropylene glycol monomethyl ether DOWANOL DPM, which are commercially available from Dow Chemical Company.

These optional materials can comprise up to about 40 percent by weight of the total weight of the film-forming composition.

If waterborne, the solids content of the film-forming composition generally ranges from about 20 to about 60 weight percent on a basis of total weight of the aqueous film-forming composition, preferably about 25 to about 50 weight percent, and more preferably about 30 to about 45 weight percent. Generally, water is the predominant non-volatile component of the aqueous film-forming composition, although organic cosolvents such as are discussed above in amounts ranging from about 10 to about 20 weight percent on a total weight basis can be included.

As discussed above, the film-forming composition can be used to form a transparent or opaque, clear or colored monocoating on the surface of a substrate. In a preferred embodiment, the film-forming composition can be used to form a transparent or opaque, clear or colored outer coating over a colored or pigmented basecoat in a multi-component composite coating composition, for example a color-plus-clear composite coating. A color-plus-clear composite coating typically comprises a basecoat deposited from a pigmented or colored film-forming composition and a transparent or clear outer coating applied over the basecoat.

The multi-component composite coating composition of the present invention can be applied to various substrates to which they adhere, including wood, metals such as steel and aluminum, glass, cloth, polymeric substrates such as thermoplastic olefins and the like. They are particularly useful for coating metals and polymeric substrates that are found on motor vehicles such as automobiles, trucks and tractors. The components can have any shape, but preferably are in the form of automotive body components such as bodies (frames), hoods, doors, fenders, bumpers and/or trim for automotive vehicles.

Suitable metal substrates that can be coated according to the present invention include ferrous metals such as iron, steel, and alloys thereof, non-ferrous metals such as aluminum, zinc, magnesium and alloys thereof, and combinations thereof. Preferably, the substrate is formed from cold rolled steel, electrogalvanized steel such as hot dip electrogalvanized steel or electrogalvanized iron-zinc steel, aluminum or magnesium. Useful polymeric substrates comprise thermoset materials, including as polyesters, epoxides, phenolics, polyurethanes such as reaction injected molding urethane (RIM) thermoset materials and mixtures thereof, and thermoplastic materials, including thermoplastic polyolefins such as polyethylene and polypropylene, polyamides such as nylon, thermoplastic polyurethanes, thermoplastic polyesters, acrylic polymers, vinyl polymers, polycarbonates, acrylonitrile-butadiene-styrene (ABS) copolymers, EPDM rubber, copolymers and mixtures thereof.

The substrate can be coated with an electrodeposited coating and/or primer such as are well known to those skilled in the art prior to depositing the outer coating or multi-component composite coating of the present invention thereon. Useful electrodepositable coating compositions are disclosed in U.S. Pat. Nos. 4,891,111; 5,760,107 and 4,933,056, which are incorporated herein by reference.

The outer coating or multi-component composite coating of the present invention can be applied to the surface of the substrate by conventional means including brushing, dipping, flow coating, spraying and the like, but they are most often applied by spraying. The usual spray techniques and equipment for air spraying and electrostatic spraying and either manual or automatic methods can be used. During application of the coating composition to the substrate, ambient relative humidity can range from about 30 to about 70 percent. The coating composition of the present invention is particularly advantageous when applied at an ambient relative humidity ranging from about 40 to about 70 percent, yielding very smooth finishes.

For the multi-component composite coating, a basecoat coating composition is applied first to the surface of the substrate to be coated. The basecoat coating composition can be waterborne or solventborne, and typically includes one or more film-forming resins, crosslinking materials (such as are discussed above) and pigments such as are described above, including titanium dioxide, chromium oxide, lead chromate, and carbon black and organic pigments such as phthalocyanine blue and phthalocyanine green. In general, the pigment is incorporated into the basecoating composition in amounts of about 20 to 70 percent by weight based on total weight of the coating composition. Non-limiting examples of suitable basecoat coating compositions include waterborne basecoats for color-plus-clear composites such as are disclosed in U.S. Pat. Nos. 4,403,003; 4,147,679; and 5,071,904, each of which is incorporated by reference herein.

After application of the basecoating to the substrate, a film is formed on the surface of the substrate by driving water out of the film by heating or by an air-drying period. Typically, the coating thickness ranges from about 0.1 to about 5 mils (about 2.54 to about 127 microns), and preferably about 0.4 to about 1.5 mils (about 10.16 to about 38.1 microns) in thickness.

The heating will preferably be only for a short period of time and will be sufficient to ensure that the outer coating can be applied to the basecoat if desired without the former dissolving the basecoat composition. Suitable drying conditions will depend on the particular basecoat composition and on the ambient humidity, but in general a drying time of from about 1 to 5 minutes at a temperature of about 80–250° F. (20–121° C.) will be adequate to ensure that mixing of the two coats is minimized. At the same time, the basecoat film is adequately wetted by the outer coating composition so that satisfactory intercoat adhesion is obtained. Also, more than one base coat and multiple topcoats may be applied to develop the optimum appearance. Usually between coats, the previously applied coat is flashed, that is, exposed to ambient conditions for about 1 to 20 minutes.

After application of the basecoat (if present), the outer coating described in detail above is applied. Preferably, the outer coating composition is chemically different or contains different relative amounts of ingredients from the basecoating composition.

The aqueous film-forming composition which forms the outer coating can be applied to the surface of the basecoat by any of the coating processes discussed above for applying the basecoating composition to the substrate. The coated substrate is then heated to cure the coating layers. In the curing operation, solvents are driven off and the film-forming materials of the outer coating and the basecoat are each crosslinked. The coated substrate is generally baked for about 10 minutes at about 140° F. and cured at a temperature in the range of from 160–350° F. (71–177° C.) but if needed, lower or higher temperatures may be used as necessary to activate crosslinking mechanisms. The thickness of the outer coating generally ranges from about 0.5 to about 5 mils (about 12.7 to about 127 microns), preferably about 1.0 to about 3 mils (about 25.4 to about 76.2 microns).

The present invention will further be described by reference to the following examples. The following examples are merely illustrative of the invention and are not intended to be limiting. Unless otherwise indicated, all parts are by weight.

EXAMPLE A

A hydroxy functional acrylic polymer was prepared from the following ingredients:

| INGREDIENTS | AMOUNT (grams) |
| --- | --- |
| Charge I | |
| Xylene | 364.3 |
| Charge II | |
| MPEG 350MA[1] | 26.0 |
| ACE[2] | 261.9 |
| 4-hydroxy butyl acrylate | 170.9 |
| Butyl acrylate | 129.9 |
| Styrene | 389.9 |
| Isobutyl methacrylate | 289.8 |
| Acrylic acid | 31.2 |
| Charge III | |
| t-butyl peracetate[3] | 49.9 |
| Xylene | 562.6 |
| Charge IV | |
| Di-t-amyl peroxide | 6.5 |
| Xylene | 13.0 |

-continued

| INGREDIENTS | AMOUNT (grams) |
| --- | --- |
| Charge V | |
| Butyl ether of diethylene glycol | 366.5 |
| Charge VI | |
| Butyl ether of diethylene glycol | 242.0 |

[1]Methoxy polyethylene glycol methacrylate, available from International Specialty Chemicals, Southampton, U.K.
[2]Acrylic functional monomer prepared by reacting equi-molar amounts of acrylic acid and CARDURA-E glycidyl neodecanoate commercially available from Shell Chemical Co.
[3]t-butyl peracetate, 50% active in mineral spirits, available from Atochem, Inc.

Charge I was added to a suitable reactor and heated to reflux, 140° C. At this temperature Charge III was added over 210 minutes. Five minutes after the start of Charge III, Charge II was added over 180 minutes. After completing addition of Charge III, the reaction mixture was held at 140° C. for 30 minutes. Charge IV was then added over 30 minutes. After completing addition of Charge IV, the contents of the flask were held at 140° C. for two hours. Charge V was added, and about 549 grams of xylene were stripped off. Finally, the product was diluted with Charge VI.

The finished product had about 68 weight percent solids and a weight average molecular weight ($M_w$) of about 40,000 grams per mole.

A waterbased clearcoat composition was prepared from the components set forth in Table 1 below. The clearcoat composition was prepared by mixing charges I–VI individually and sequentially to form a blend, with mixing after each addition. After adding charge VI, the resulting blend was mixed for one hour. The mixed resin blend was allowed to sit overnight. Charge VII was added in 100 gram aliquots until the first stated amount in Table 1 was reached. The dispersion was allowed to sit overnight. The remaining amount of Charge VII was added as the second amount given in Table 2 to bring the dispersion to the viscosity stated in Table 1 in seconds efflux cup in a #4 DIN cup at 25° C.

TABLE 1

| Components | Amount (g) |
| --- | --- |
| Charge I | |
| Acrylic Polymer from above | 680.0 |
| Polyester[4] | 28.4 |
| Charge II | |
| TINUVIN 1130[5] | 5.8 |
| TINUVIN 292[6] | 3.8 |
| Charge III | |
| BYK 333[7] | 1.7 |
| BYK 345[8] | 3.4 |
| Charge IV | |
| TACT[9] | 94.2 |
| Charge V | |
| LUWIPAL 018[10] | 109.5 |
| CYMEL 303[11] | 7.2 |
| Charge VI | |
| Dimethyl ethanolamine | 14.7 |
| DDBSA[12] | 3.4 |

TABLE 1-continued

| Components | Amount (g) |
|---|---|
| Charge VII | |
| Deionized water | 650/100 |
| Viscosity (sec.) | 30 |

[4]Polyester synthesis is described in the U.S. Pat. No. 5,468,802 as example 2.
[5]TINUVIN 1130 UV absorber available from Ciba-Geigy AG.
[6]TINUVIN 292 hindered amine light stabilizer available from Ciba-Geigy AG.
[7]Silicone surface additive available from Byk Chemie.
[8]Silicone wetting surfactant available from Byk Chemie.
[9]Tris-alkoxy carbamoyl triazine available from Cytec.
[10]Butylated melamine available from BASF Corp.
[11]Fully methylated melamine available from Cytec.
[12]Dodecyl benzene sulfonic acid.

The waterborne clearcoat of Table 1 and 1 K WBCC waterborne clearcoat (Control) commercially available from Herberts were sprayed from an ECO bell in an environment controlled to 70° F. and 60% relative humidity on steel panels coated with ED5000 electrocoat and GPXH5379 primer available from ACT Laboratories Inc. The coating was applied over L 147 0223 Star Silver commercial waterborne basecoat available from BASF Corp. of Parsippany, N.J. The basecoat was applied in two coats, electrostatic and pneumatic, with a 140 sec flash between coats and then partially dehydrated for 10 minutes at 176° F. (80° C.). The clearcoat was applied in two coats, electrostatic only, with a 155 second flash between the coats. The clearcoated panels were allowed to flash for three minutes at ambient condition, dehydrated for 10 minutes at 140° F. (60° C.) and baked for 30 minutes at 285° F. (140.5° C.). Panels were baked in a horizontal position. The overall film thickness was approximately 2.0 mils (50.8 microns).

Each of the coating examples was evaluated after baking for physical properties (battery acid resistance) and appearance properties (gloss and crater sensitivity). A 4 by 12 inch (10.16×30.5 cm.) panel was used to assess physical properties and a 12 by 18 inch (30.5×45.7 cm) was examined for cratering sensitivity. Specular gloss was measured at 20° with a Novo Gloss Statistical Glossmeter from Gardco where higher numbers indicate better performance.

Battery acid tests were conducted by placing three to five 0.4 ml droplets of 38% aqueous sulfuric acid solution on panels for 72 hours in an environment which is temperature (23±2° C.) and humidity (40% RH) controlled. Ratings for the exposed areas were assessed according to the following scale: 1.0 is untouched, 0.9 indicates a faint ring, 0.8 indicates a distinct circumferential ring, 0.7 indicates a ring, haze and/or loss of DOI within the ring, 0.6 indicates swelling, discoloration and blisters no larger than 1 mm in diameter, 0.5 indicates swelling, discoloration and blisters larger than 1 mm in diameter. Classic and contaminant craters on 12×18 inch (30.5×45.7cm) panels were counted by visual observation. The results of the testing are set forth in Table 2 below.

TABLE 2

| Sample | Battery Acid Resistance | Comments | Gloss | Number of Craters |
|---|---|---|---|---|
| Control | 0.7 | Ring, haze and loss of DOI | 82.3 | 4 |
| Example 1 | 1.0 | Untouched | 92.0 | 0 |

The waterborne clearcoat of the present invention provided better battery acid resistance and gloss than the panel coated with the Control waterborne clearcoat.

EXAMPLE B

A hydroxy functional acrylic polymer was prepared from the following ingredients:

| INGREDIENTS | AMOUNT (grams) |
|---|---|
| Charge I | |
| Xylene | 449.8 |
| Charge II | |
| MPEG 350MA[13] | 18.5 |
| Hydroxyethyl methacrylate | 277.9 |
| Butyl acrylate | 218.6 |
| Styrene | 194.5 |
| Butyl methacrylate | 194.5 |
| Charge III | |
| MPEG 350 MA | 6.2 |
| Hydroxyethyl methacrylate | 92.6 |
| Butyl acrylate | 72.9 |
| Styrene | 64.9 |
| Butyl methacrylate | 64.9 |
| Acrylic acid | 29.6 |
| Charge IV | |
| LUPERSOL 555[14] | 20.6 |
| Xylene | 84.7 |
| Charge V | |
| Butyl ether of diethylene glycol | 320.4 |
| Charge VI | |
| Methyl ether of propylene glycol | 214.1 |

[13]Methoxy polyethylene glycol methacrylate, available from International Specialty Chemicals, Southampton, U.K.
[14]t-Amyl peracetate, 60% active in mineral spirits, available from Atochem, Inc.

Charge I was added to a suitable reactor and heated to 120° C. At this temperature Charge IV was added over 210 minutes. Fifteen minutes after the start of addition of Charge IV, Charge II was added over 120 minutes. After completion of Charge II, the reaction mixture was held at 120° C. for 15 minutes. Charge III was then added over 45 minutes. After the completion of addition of Charge IV, the contents of the flask were held for one hour at 120° C. Charge V was added, and about 530 gram of xylene was stripped off. Finally, the product was diluted with Charge VI.

The finished product had about 70% weight percent solids and a weight average molecular weight ($M_w$) of about 35,000 grams per mole.

A polymer composition was prepared by mixing 1000 grams of the hydroxy functional acrylic polymer above and 126 grams of Polyester A at a temperature of about 50° C. The composition and synthesis of Polyester A is disclosed in U.S. Pat. No. 5,468,802 as Example 2.

Waterbased clearcoat compositions were prepared from the components indicated in Table 3. The clearcoat compositions were prepared by mixing charge I for 1 hour. Charges II, III, IV, V and VI were added individually and sequentially to form a resulting blend, with mixing after each addition. The time of mixing varied as follows for the charges indicated in ( ): (II) 1 hour, 20 minutes; (III) for 20 minutes; (IV) for 20 minutes; (V) for 30 minutes; and (VI) for one hour. The mixed resin blend was allowed to sit overnight. Charge VII was added in 10 gram aliquots until the first stated amount in Table 3. The dispersion was allowed to sit overnight. The remaining amount of Charge VII was added as the second amount given in Table 3 to bring the dispersion to the viscosity stated in Table 3 in seconds efflux cup in a #4 DIN cup at 25° C.

Example C had the first two components of Table 3 added as charge IA with mixing for 1 hour and the next two components were added as a charge IB to charge IA and mixed for 5 minutes. The remaining components were added as the indicated charges in examples A–C except the mixing after the addition of charges II and III were for 5 minutes and after charge IV was for 30 minutes.

TABLE 3

| | Amount (grams) | | |
|---|---|---|---|
| Components | A | B | C |
| Charge I | | | |
| Acrylic Polymer from above | 673.9 | — | 613.8 |
| Polyester from above | — | 659.9 | 54.2 |
| Diethylene glycol monobutyl ether | 24.9 | 25.5 | 25.2$^a$ |
| Propylene glycol | 69.5 | 71.0 | 70.3$^a$ |
| Charge II | | | |
| TINUVIN 1130[15] | 13.1 | 13.3 | 13.2 |
| TINUVIN 292[16] | 9.2 | 9.4 | 9.3 |
| Charge III | | | |
| Silicone oil | 3.8 | 3.9 | 3.9 |
| Charge IV | | | |
| Blocked isocyanate[17] | 228.9 | 234.1 | 231.7 |
| Charge V | | | |
| Cymel 328 melamine resin[18] | 191.0 | 159.6 | 157.9 |
| Charge VI | | | |
| Dimethyl amino propyl amine[19] | 120.5 | 123.2 | 120.4 |
| Charge VII | | | |
| Deionized water | 550/130 | 500/138 | 600.0?? |
| Viscosity (sec.) | 26 | 29 | 30 |

[15]TINUVIN 1130 UV absorber available from Ciba-Geigy AG.
[16]TINUVIN 292 hindered amine light stabilizer available from Ciba-Geigy AG.
[17]Methylethylketoxime blocked trimer of isophorone diisocyanate purchased from Huls Chemicals and diluted to 57% solid in Solvenon DIP dipropyleneglycol monoisopropyl ether.
[18]Cymel 328 partially alkylated melamine resin available from Cytec Industries.
[19]10% aqueous solution.

Each of the waterborne clearcoat examples was sprayed from an AERO bell in an environment controlled to 70° F. and 60% relative humidity. The coating was applied over commercial black waterborne basecoat available as Herberts Aqua Color Base 653195 from Herberts GmbH. The basecoat was applied in two coats, without a flash between coats, and then dehydrated for 10 minutes at 176° F. (80° C.). The clearcoat was applied in two coats without any flash between the coats. The clearcoated panels were allowed to flash for three minutes at ambient condition, dehydrated for 10 minutes at 140° F. (60° C.) and baked for 30 minutes at 285° F. (140.5° C.). Panels were baked in a horizontal position. The film build was approximately 2.0 mils (50.8 microns).

Each of the coating examples was evaluated after baking for crater sensitivity. An entire 4 inch by 12 inch (10.16×30.5 cm.) panel was examined in each case and the total number of craters on each panel was counted.

Panels coated with clearcoat Examples B and C including amphiphilic adjuvants according to the present invention provided much greater resistance to crater formation than the panel coated with clearcoat Example A (control) formulated without the adjuvant The outer coating and multi-component composite coating composition of the present invention can provide advantages in automotive coating applications including good popping resistance, better appearance (gloss and DOI) and resistance to adverse environmental conditions such as acid rain and humidity.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A coated substrate having on at least a portion of a surface thereof an outer coating deposited from a film-forming composition, the film-forming composition comprising:
   (a) a crosslinkable, non-gelled acrylic polymer which is the reaction product of the following monomers:
      (i) a polyoxyalkylene acrylate monomer comprising a terminal alkoxy group containing about 1 to about 6 carbon atoms; and
      (ii) a copolymerizable ethylenically unsaturated monomer different from the polyoxyalkylene acrylate monomer (i); and
   (b) a crosslinking material capable of reacting with the acrylic polymer to form a crosslinked outer coating,
   wherein the crosslinkable, non-gelled acrylic polymer is characterized in that it comprises between 1 to 10 weight percent of (i), the polyoxyalkylene acrylate monomer, based on the total combined weight of resin solids of (i) and (ii).

2. The coated substrate according to claim 1, wherein the substrate is formed from a metallic material selected from the group consisting of iron, steel, aluminum, zinc, magnesium, alloys and combinations thereof.

3. The coated substrate according to claim 1, wherein the substrate is formed from a polymeric material.

4. The coated substrate according to claim 1, wherein the outer coating is a monocoat.

5. The coated substrate according to claim 1, wherein the outer coating is applied over a basecoat.

6. The coated substrate according to claim 1, wherein the polyoxyalkylene acrylate monomer is selected from the group consisting of alkoxy polyoxyethylene acrylates, alkoxy polyoxyethylene methacrylates, alkoxy polyoxypropylene acrylates, alkoxy polyoxypropylene methacrylates, alkoxy polyoxyethyleneoxypropylene acrylates, alkoxy polyoxyethyleneoxypropylene methacrylates and mixtures thereof.

7. The coated substrate according to claim 1, wherein the terminal alkoxy group of the polyoxyalkylene acrylate monomer is selected from the group consisting of methoxy groups, ethoxy groups, butoxy groups, pentoxy groups and hexoxy groups.

8. The coated substrate according to claim 1, wherein the acrylic polymer comprises at least one functional group selected from the group consisting of hydroxy groups, amido groups, carboxy groups, carbamate groups, urea groups and urethane groups.

9. The coated substrate according to claim 1, wherein the polyoxyalkylene acrylate monomer comprises about 0.5 to about 80 percent by weight of the monomers used to produce the acrylic polymer.

10. The coated substrate according to claim 1, wherein the ethylenically unsaturated monomer is selected from the group consisting of ethylenically unsaturated carboxylic acid monomers, alkyl esters of ethylenically unsaturated carboxylic acid monomers, hydroxyalkyl esters of ethylenically unsaturated carboxylic acid monomers, ethylenically unsaturated carbamates, ethylenically unsaturated ureas, ethylenically unsaturated urethanes, ethylenically unsaturated silanes, vinyl aromatics, acrylamides, acrylonitriles, vinyl halides, vinyl acetates, vinyl ethers, ally ethers, allyl alcohols, vinyl esters, vinyl sulfonic acids, vinyl phosphonic acids, derivatives thereof and mixtures thereof.

11. The coated substrate according to claim 10, wherein the ethylenically unsaturated carboxylic acid monomers are selected from the group consisting of acrylic acid, methacrylic acid, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof.

12. The coated substrate according to claim 10, wherein the alkyl esters of ethylenically unsaturated carboxylic acid monomers are selected from the group consisting of methyl acrylate, ethyl acrylate, butyl acrylate, methyl methacrylate, ethyl methacrylate, butyl methacrylate, 2-ethylhexyl acrylate, 2-ethylhexyl methacrylate, ethylene glycol dimethacrylate, isobornyl methacrylate, lauryl methacrylate and mixtures thereof.

13. The coated substrate according to claim 10, wherein the hydroxyalkyl esters of ethylenically unsaturated carboxylic acid monomers are selected from the group consisting of 2-hydroxyethyl acrylate, 2-hydroxyethyl methacrylate, hydroxybutyl acrylate, hydroxypropyl methacrylate and the reaction product of a lactone with hydroxyethyl acrylate.

14. The coated substrate according to claim 10, wherein the hydroxyalkyl esters of ethylenically unsaturated carboxylic acid monomers comprise at least one reaction product of the following reactions:
(a) an ethylenically unsaturated, epoxy functional monomer reacted with a carboxylic acid containing about 13 to about 20 carbon atoms; and/or
(b) an ethylenically unsaturated acid functional monomer reacted with an epoxy compound containing at least 5 carbon atoms which does not contain ethylenic unsaturation that would participate in free-radical initiated polymerization with the ethylenically unsaturated acid functional monomer.

15. The coated substrate according to claim 14, wherein the ethylenically unsaturated, epoxy functional monomer is selected from the group consisting of glycidyl acrylate, glycidyl methacrylate, allyl glycidyl ether, methallyl glycidyl ether, 1:1 (molar) adducts of ethylenically unsaturated monoisocyanates with hydroxy functional monoepoxides, glycidyl esters of polymerizable polycarboxylic acids and mixtures thereof.

16. The coated substrate according to claim 14, wherein the ethylenically unsaturated acid functional monomer is selected from the group consisting of monocarboxylic acids, dicarboxylic acids, monoesters of dicarboxylic acids and mixtures thereof.

17. The coated substrate according to claim 14, wherein the epoxy compound is selected from the group consisting of 1,2-pentene oxide, styrene oxide, glycidyl esters, glycidyl ethers and mixtures thereof.

18. The coated substrate according to claim 17, wherein the glycidyl esters have the structural formula:

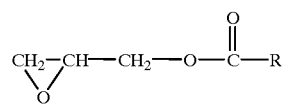

wherein R is a hydrocarbon radical containing from about 4 to about 26 carbon atoms.

19. The coated substrate according to claim 14, wherein the hydroxyalkyl ester of an ethylenically unsaturated carboxylic acid monomer is the reaction product of an ethylenically unsaturated acid functional monomer which is acrylic acid and an epoxy compound which is a glycidyl ester of neodecanoic acid.

20. The coated substrate according to claim 10, wherein the vinyl aromatics are selected from the group consisting of styrene, vinyl toluene and mixtures thereof.

21. The coated substrate according to claim 1, wherein the ethylenically unsaturated monomer comprises about 10 to about 99.5 percent by weight of the monomers used to produce the acrylic polymer.

22. The coated substrate according to claim 1, wherein other components used to form the acrylic polymer reaction product are selected from the group consisting of polyesters, chain transfer agents, initiators, surfactants and solvents.

23. The coated substrate according to claim 1, wherein the acrylic polymer is a hydroxyl functional acrylic polymer.

24. The coated substrate according to claim 23, wherein the acrylic polymer is the reaction product of an alkoxy polyoxyethylene methacrylate, acrylic acid, glycidyl ester of neodecanoic acid, hydroxy butyl acrylate, styrene, butyl acrylate and isobutyl methacrylate.

25. The coated substrate according to claim 1, wherein the acrylic polymer is present in an amount ranging from about 10 to about 90 weight percent on a basis of total resin solids of the film-forming composition.

26. The coated substrate according to claim 1, wherein the crosslinking material is present in an amount ranging from about 10 to about 90 weight percent on a basis of total resin solids of the film-forming composition.

27. The coated substrate according to claim 1, wherein the crosslinking material is selected from the group consisting of aminoplasts, triazines, polyisocyanates and mixtures thereof.

28. The coated substrate according to claim 1, wherein the film-forming composition further comprises at least one amphiphilic adjuvant comprising: a water-soluble polar end comprising at least one terminal hydrophilic group selected from the group consisting of hydroxyl groups, carbamate groups, amide groups, urea groups and mercaptan groups; and a water-insoluble hydrocarbon end comprising at least six contiguous carbon atoms, wherein the adjuvant has an acid value of less than about 30.

29. The coated substrate according to claim 1, wherein the film-forming composition further comprises a crosslinkable film-forming resin selected from the group consisting of polyesters, polyurethanes, acrylic polymers, polyamides, polyethers and copolymers and mixtures thereof, the crosslinkable film-forming resin being different from the acrylic polymer (a).

30. A multi-component composite coating composition comprising a basecoat deposited from a pigmented basecoat film-forming composition and an outer coating applied over the basecoat in which the outer coating is deposited from a film-forming composition, the film-forming composition comprising:
   (a) a crosslinkable, non-gelled acrylic polymer which is the reaction product of the following monomers:
      (i) a polyoxyalkylene acrylate monomer comprising a terminal alkoxy group containing about 1 to about 6 carbon atoms; and
      (ii) a copolymerizable ethylenically unsaturated monomer different from the polyoxyalkylene acrylate monomer (i); and
   (b) a crosslinking material capable of reacting with the acrylic polymer to form a crosslinked transparent topcoat,
wherein the crosslinkable, non-gelled acrylic polymer is characterized in that it comprises between 1 and 10 weight percent of (i), the polyoxyalkylene acrylate monomer, based on the total combined weight of resin solids (i) and (ii).

31. The coated substrate according to claim 30, wherein the basecoat film-forming composition is selected from the group consisting of waterborne coating compositions and solventborne coating compositions.

32. The coated substrate according to claim 31, wherein the basecoat film-forming composition is a waterborne coating composition.

33. The coated substrate according to claim 30, wherein the outer coating is selected from the group consisting of waterborne coating compositions, solventborne coating compositions and powder coating compositions.

34. A substrate having on at least a portion of a surface thereof a multi-component composite coating composition comprising a basecoat deposited from a pigmented basecoat film-forming composition and an outer coating applied over the basecoat in which the outer coating is deposited from a film-forming composition, the film-forming composition comprising:
   (a) a crosslinkable, non-gelled acrylic polymer which is the reaction product of the following monomers:
      (i) a polyoxyalkylene acrylate monomer comprising a terminal alkoxy group containing about 1 to about 6 carbon atoms; and
      (ii) a copolymerizable ethylenically unsaturated monomer different from the polyoxyalkylene acrylate monomer (i); and
   (b) a crosslinking material capable of reacting with the acrylic polymer to form a crosslinked outer coating,
wherein the crosslinkable, non-gelled acrylic polymer is characterized in that it comprises between 1 and 10 weight percent of (i), the polyoxyalkylene acrylate monomer, based on the total combined weight of resin solids (i) and (ii).

* * * * *